United States Patent Office 3,454,620
Patented July 8, 1969

3,454,620
PROCESS FOR MANUFACTURE OF URETHANES FROM HYDROXYL GROUP CONTAINING COMPOUND, NITROGENOUS COMPOUND AND CARBON MONOXIDE IN PRESENCE OF TRANSITION METAL COMPOUND
George Albert Gamlen, Runcorn, and Arthur Ibbotson, Manchester, England, assignors to Imperial Chemical Industries Limited, London, England, a corporation of Great Britain
No Drawing. Filed Nov. 4, 1966, Ser. No. 591,952
Claims priority, application Great Britain, Nov. 8, 1965, 47,261/65
Int. Cl. C07c *125/06;* C08g *22/04*
U.S. Cl. 260—471                                                              11 Claims

ABSTRACT OF THE DISCLOSURE

A process for the manufacture of urethanes by reacting an organic compound containing at least one hydroxyl group with carbon monoxide and a nitrogenous organic compound containing at least one non-cyclic group in which a nitrogen atom is directly attached to a single carbon atom and is also attached through a double bond to an oxygen or another nitrogen atom, in the presence as catalyst of a metal complex compound containing at least one transition metal having an atomic number in the range 21–29, 39–47 and 71–79, inclusive, and at least one unsaturated hydrocarbon ligand in which the unsaturated system forms a bond with the metal.

---

This invention relates to the manufacture of urethanes.

It has already been proposed to manufacture urethanes by reacting hydroxyl group-containing organic compounds, such as alcohols or phenols, with carbon monoxide and certain nitrogenous organic compounds, such as nitro-compounds. It has also been proposed to use as catalysts for this reaction certain metal carbonyls and certain metal complex compounds.

It has now been found that the above-mentioned reaction may be performed with excellent yield and reproducibility by conducting it in the presence as catalyst of certain metal complex compounds containing unsaturated systems.

According to the present invention there is provided a process for the manufacture of urethanes by reacting an organic compound containing at least one hydroxyl group with carbon monoxide and a nitrogenous organic compound containing at least one non-cyclic group in which a nitrogen atom is directly attached to a single carbon atom and is also attached through a double bond to an oxygen or another nitrogen atom, in the presence as catalyst of a metal complex compound containing at least one transition metal and at least one unsaturated hydrocarbon ligand in which the unsaturated system forms a bond with the metal.

By the term "transition metal" there is meant a metal having an atomic number in the range 21–29, 39–47 and 71–79, inclusive.

Hydroxy compounds suitable for use in the process of the present invention may be, for example, mono- or polyhydric alcohols containing primary, secondary or tertiary hydroxyl groups as well as mono- and polyhydric phenols. Mixtures of these hydroxy compounds may also be used. The alcohols may be aliphatic or aromatic and may bear other substituents in addition to hydroxyl groups but the substituents should, except as hereinafter described, preferably be non-reactive to carbon monoxide under the reaction conditions.

Generally the hydroxyl group-containing compounds conform with one or other of the general formulae $R(OH)_n$ and $R'(OH)_n$ wherein $n$ is 1 or more and preferably from 1 to 3, R is an optionally substituted aliphatic, cycloaliphatic or araliphatic group preferably containing from 1 to 20 carbon atoms, R' is an aromatic group containing one or more benzenoid rings and preferably not more than 3 rings which may be fused or joined by single valency bonds, directly or through bridging groups which may be, for example, oxygen or sulphur atoms or sulphoxide, sulphone or carbonyl groups, or alkylene groups in which, if desired, the carbon chain may be interrupted by, for example, oxygen or sulphur atoms, sulphoxide, sulphone or carbonyl groups, for example methylene, oxymethylene, dimethylene sulphone or dimethylene ketone groups.

The group R may be alkyl, cycloalkyl, alkylene, cycloalkylene or aralkyl and the main carbon chain may if desired be interrupted, for example, by oxygen or sulphur atoms, sulphoxide, sulphone, carbonyl or carboxylic ester groups. The main chain may bear as substituents, for example, alkyl, alkoxy, aryl or aryloxy groups normally containing less than 10 carbon atoms. Especially suitable compounds of the formula $R(OH)_n$ are monohydric alcohols such as methyl, ethyl, n- and sec-propyl, n-, iso-, sec- and tert-butyl, amyl, hexyl, lauryl, cetyl, benzyl, chlorobenzyl and methoxybenzyl alcohols as well as diols such as ethylene glycol, diethylene glycol, propylene glycol and dipropylene glycol, triols such as glycerol, trimethylol propane, hexanetriol, tetrols such as pentaerythritol and the ethers of such polyols providing that at least one OH group remains unetherified. The etherifying group in such ether alcohols normally contains up to 10 carbon atoms and is preferably an alkyl, cycloalkyl or aralkyl group which may be substituted, for example, a halogenoalkyl group. An especially suitable compound of the formula $R(OH)_n$ is methanol but other preferred compounds are ethanol, propanol, butanol, ethylene glycol, glycerol and trimethylol propane. The phenolic compounds of the general formula $R'(OR)_n$ may carry substituents in the benzenoid rings, for example, alkyl and alkoxy groups containing up to 10 carbon atoms and halogen atoms. Suitable mono and polyhydric phenols include phenol, chlorophenol, methyl, ethyl, butyl and alkyl phenols, catechol, resorcinol, quinol, 4,4'-dihydroxydiphenylmethane, naphthols, chloronaphthols, methyl, ethyl, butyl and octyl naphthols, anthranols, chloroanthranols, methyl, ethyl, butyl and octyl anthranols, phenanthrols, chlorophenanthrols, methyl, ethyl, butyl and octyl phenanthrols, pyrogallol, phloroglucinol, hydroxyquinol and the ethers of the polyhydroxyphenols providing at least one OH remains unetherfied. The etherifying group in such ethers normally contains up to 10 carbon atoms and is preferably an alkyl, cycloalkyl or aralkyl groups which may be substituted, for example, a halogenoalkyl group. Among the abovementioned aromatic compounds phenol, chlorophenol, octylphenol, 4,4'-dihydroxydiphenylmethane, naphthols, anthranols, and phenanthrols are particularly preferred and especially phenol itself.

As suitable nitrogenous compounds containing at least one non-cyclic group in which a nitrogen atom is directly attached to a single carbon atom and through a double bond to oxygen or another nitrogen atom there may be mentioned organic nitro, nitroso, azo and azoxy compounds, of which organic nitro compounds are generally preferred.

As examples of nitro compounds for use in the process there may be mentioned mononitro compounds such as nitrobenzene, alkyl and alkoxy nitrobenzenes wherein the alkyl group contains up to 10 carbon atoms, aryl and aryloxy nitrobenzenes, wherein the aryl group is phenyl, tolyl, naphthyl, xylyl, chlorophenyl, chlorotolyl, chloroxylyl or chloronaphthyl, chloronitrobenzenes, dinitro compounds such as dinitrobenzene, alkyl and alkoxy dinitrobenzenes wherein the alkyl group contains up to 10 carbon atoms, aryl and aryloxy dinitrobenzenes, trinitro compounds such as trinitrobenzene, alkyl and alkoxytrinitrobenzenes, aryl and aryloxytrinitrobenzenes, the substituents being any of those already mentioned and chlorotrinitrobenzenes as well as similarly substituted mono and polynitro derivatives of the naphthalene, diphenyl, diphenylmethane, anthracene and phenanthrene series. Substituted or unsubstituted aliphatic nitro compounds such as nitromethane, nitroethane, nitropropane, nitrobutane, 2,2'-dimethyl nitrobutane, nitrocyclopentane, nitrocyclohexane, nitrocyclobutane, 3-methylnitrobutane, nitrooctadecane, 3-nitropropene-1, phenyl nitromethane, p-bromophenyl nitromethane, p-nitrophenyl nitromethane, p-methoxy phenyl nitromethane, dinitroethane, dinitropropane, dinitrobutane, dinitrohexane, dinitrodecane, dinitrocyclohexane, dinitromethylcyclohexane, di-(nitrocyclohexyl)-methane are also suitable. From this group of nitro compounds nitrobenzene, nitrotoluene, dinitrobenzene, dinitrotoluene, trinitrobenzene, trinitrotoluene, mononitronaphthalene, dinitronaphthalene, 4,4'-dinitrodiphenylmethane, nitrobutane, nitrocyclohexane, p-nitrophenylnitromethane, dinitrocyclohexane, dinitromethylcyclohexane, dinitrocyclohexylmethane, are preferred and in particular aromatic nitro compounds especially 2,4- and 2,6-dinitrotoluenes and meta and para dinitrobenzenes.

Examples of suitable nitroso compounds are the aromatic nitroso compounds such as nitrosobenzene, nitrosotoluene, dinitrosobenzene, dinitrosotoluene and the aliphatic nitroso compounds such as nitrosobutane, nitrosocyclohexane and dinitrosomethylcyclohexane.

Suitable azo compounds have the general formula $R_1-N=N-R_2$, wherein $R_1$ and $R_2$ may be either the same or different substituted or unsubstituted alkyl or aryl groups selected from amongst those already listed in the description of suitable nitro compounds. Azobenzene, nitroazobenzene, chloroazobenzene and alkyl or aryl substituted azobenzene are particularly preferred.

Suitable azoxy compounds have the general formula

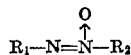

wherein $R_1$ and $R_2$ may be the same or different substituted or unsubstituted alkyl or aryl groups selected from amongst those already listed in the description of suitable nitro compounds. Azoxybenzene, nitroazoxybenzene, chloroazoxybenzene, alkyl and aryl susbtituted azoxybenzenes are particularly preferred.

The invention includes the use of any mixture of nitro compounds, nitroso compounds, azo or azoxy compounds with any mixture of hydroxy compounds and also the use of compounds containing both functions, i.e. hydroxynitro compounds, hydroxynitroso compounds, hydroxyazo and hydroxyazoxy compounds such as 2-hydroxynitroethane, 2-hydroxynitrosoethane, nitrophenols, nitronaphthols, nitrosophenols, nitrosonaphthols, hydroxy azobenbenes and hydroxyazoxybenzene. Mixtures of these nitrogen-containing compounds may also be used.

The process of the invention has been found to proceed most smoothly to give the highest yields when employing nitro compounds. It is accordingly preferred to use nitro compounds rather than nitroso, azo or azoxy compounds.

The metal complex compounds which are used as catalysts in the process of the invention may contain in the molecule one or more atoms of a transition metal as hereinbefore defined, and, in the case where two or more such atoms are present, these atoms may be of the same transition metal or of different transition metals. The preferred catalysts are complexes of one or more of the metals ruthenium, rhodium, palladium, osmium, iridium and platinum. Particularly preferred catalysts are complexes of rhodium and palladium. The unsaturated ligands which are capable of forming bonds with the transition metal or metals present may be molecules, radicals or ions containing one or more unsaturated carbon-carbon linkages. Examples of suitable unsaturated molecules include ethylene, isobutylene, cyclohexene, cyclopentadiene, norbornadiene, cyclooctadiene, cycloheptatriene and cyclooctatetraene. An example of a suitable unsaturated radical is the allyl radical and an example of a suitable unsaturated ion is the cyclopentadienyl ion.

The metal complexes may also contain other ligands, attached to the metal atom or atoms, which do not contain ethylenic unsaturation. Examples of such other ligands are hydrogen atoms, halogen atoms, carbon monoxide, nitric oxide, alkyl radicals, alkyl or aryl nitriles, alkyl or aryl isonitriles, trialkyl, triaryl or fully substituted alkyl aryl phosphines, arsines or stibines, and nitrogen-containing heterocyclic compounds such as 2:2'-dipyridyl and piperidine.

Examples of metal complexes containing unsaturated systems which are suitable as catalysts for the process of the invention include:

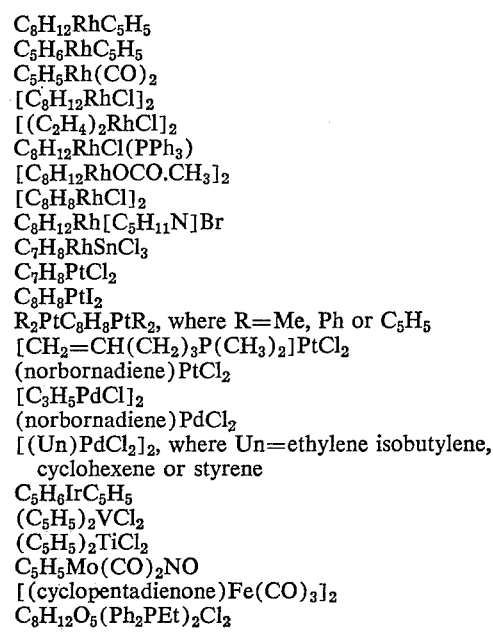

In addition to non-ionic complexes such as those mentioned above, ionic complexes containing unsaturated systems are suitable as catalysts; examples of such complexes include:

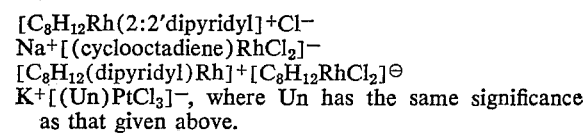

In carrying out the process of the invention it is preferred to have present in the reaction mixture, in addition to the reactants and catalysts already described, a co-catalyst consisting of a multivalent metal or a salt of a mutivalent metal. Suitable multivalent metals or salts thereof include the metals and their respective salts of Groups VI, VII and VIII of the Periodic Classification as well as gold, mercury, cerium, thallium, titanium, zirconium, copper, tin, lead, vanadium, niobium and tantalum. A particularly suitable metal is iron; particularly suitable metal salts include ferrous and ferric chlorides, cuprous chloride, stannous chloride, stannous octoate, chromium chloride and palladium chloride. Of the various metal salts that may be employed, the halides show the greatest activity as co-catalysts; because of their greater ease of preparation, the chlorides are the preferred metal salts. The metal salts which are particularly preferred as co-catalysts in the process of the invention are ferrous chloride, ferric chloride and cuprous chloride.

The metal complexes containing unsaturated systems employed as catalysts in the process of the invention are conveniently used in amounts of from 0.1% to 5% by weight based on the amount of nitrogenous compound to be reacted, although larger amounts may be employed if a higher rate or reaction is desired. The metal or metal salt co-catalysts described above may be employed in any suitable amount but best results are usually achieved if the amount used is from 2% to 10% of the weight of the nitrogenous compound to be reacted.

The process of the invention is conveniently carried out as super-atmospheric pressure, preferably at between 50 and 500 atmospheres, although higher or lower reaction pressures may be employed if the other reaction conditions are suitably adjusted. Reaction temperatures of up to 250° C. may be employed, but in order to obviate side reactions whilst achieving a convenient rate of reaction it is generally preferred to operate the process in the range 100–175° C.

The process may be carried out continuously or in a batchwise manner, and the catalyst may be employed in the pure state or supported on a suitable substrate such as alumina or kieselguhr. If desired, the process may be operated in the presence of a diluent or diluents; suitable diluents are liquids which are inert towards carbon monoxide and are capable of dissolving the non-gaseous reactants. Suitable diluents include aliphatic, cycloaliphatic and aromatic hydrocarbons, such as n-butyl chloride, chloroform, carbon tetrachloride, chlorobenzene, benzotrichloride, trichloromonofluoromethane and 1,1,2-trichloro-1,2,2-trifluoroethane, ketones, esters, ethers and cyclic ethers. Mixtures of such diluents may be used. Alternatively the process may conveniently be operated in the presence of an excess of either the hydroxyl group-containing compound or the nitrogenous compound, which then performs as both reactant and diluent.

The invention is useful for the preparation of compounds containing one or more urethane groups and which may be monomeric or polymeric in nature. Thus the reaction may be adopted for the preparation of monourethanes from mononitro compounds, nitroso compounds, azo compounds or azoxy compounds and monohydroxy compounds and for the preparation of polyurethanes from polynitro compounds, polynitroso, nitro or nitroso substituted azo or azoxy compounds and monofunctional hydroxy compounds. The urethane products of the process of this invention are useful, for example, as agricultural chemicals. The products are also valuable as chemical intermediates; in particular those urethanes containing not more than three urethane groups per molecule may be converted to the corresponding isocyanates, for example by heating or other methods fully described in the prior art.

Additionally polyurethane polymers may be obtained by the interaction of polynitro, polynitroso or nitro substituted azo or azoxy compounds with polyols and carbon monoxide. Thus linear polyurethanes, useful for example as fibres or elastomers, may be obtained directly, for example, from diols, dinitro compounds and carbon monoxide or from hydroxynitro compounds and carbon monoxide whilst crosslinked polyurethan polymers, useful for example as flexible or rigid plastics, may be obtained directly from, for example, mixtures of di- or polynitro compounds, diols or polyols and carbon monoxide.

The invention is illustrated but not limited by the following example in which parts are by weight:

EXAMPLE

Nitrobenzene (10.0 parts) and methanol (40 parts) were heated at 150° C. in an agitated pressure vessel under a carbon monoxide atmosphere (initially 80 atmospheres pressure, rising to a maximum of 120 atmospheres) for 10 hours in the presence of cyclooctadienyl rhodium chloride $[C_8H_{12}RhCl]_2$ (0.1 part) and ferric chloride (0.5 part).

Analysis of the reaction product by gas-liquid chromatography showed it to contain 5.8 parts of methyl carbanilate. This amount corresponds to a yield of 47% based on the nitrobenzene charged.

We claim:
1. A process for the manufacture of urethanes in which a hydroxyl group-containing organic compound selected from the group consisting of monohydric alcohols and phenols is reacted with carbon monoxide and a nitrogenous organic compound selected from the group consisting of saturated and ethylenically unsaturated aliphatic and aromatic nitro compounds at a superatmospheric pressure and at a temperature up to 250° C. in the presence as catalyst of a complex compound of a metal selected from the group consisting of ruthenium, rhodium, palladium, osmium, iridium and platinum, the said complex compound containing at least one unsaturated cyclic hydrocarbon ligand in which the unsaturated system forms a bond with the metal, and in the presence as a co-catalyst of a salt of a transition metal having an atomic number in the ranges 21–29, 39–47 and 71–79.

2. A process as claimed in claim 1, wherein the hydroxyl group-containing compound is methanol.

3. A process as claimed in claim 1, wherein the nitrogenous organic compound is nitrobenzene.

4. A process as claimed in claim 1, wherein the unsaturated cyclic hydrocarbon ligand is cyclooctadiene.

5. A process as claimed in claim 4, wherein the metal complex compound is cyclooctadienyl rhodium chloride.

6. A process as claimed in claim 1, wherein the metal complex compound is used in an amount of from 0.1% to 5% of the weight of the nitrogenous compound to be reacted.

7. A process as claimed in claim 1, wherein the salt of a transition metal is the chloride of such a metal.

8. A process as claimed in claim 7, wherein the transition metal chloride is selected from the group consisting of ferric chloride, ferrous chloride and cuprous chloride.

9. A process as claimed in claim 1, wherein the transition metal salt is used in an amount of from 2% to 10% of the weight of the nitrogenous compound to be reacted.

10. A process as claimed in claim 1, wherein the reaction is carried out at a pressure of between 50 and 500 atmospheres.

11. A process as claimed in claim 1 wherein the reaction is carried out at a temperature in the range 100–175° C.

References Cited

UNITED STATES PATENTS 3,245,774    4/1966    Bachmann _____ 260—471

LARRAINE A. WEINBERGER, *Primary Examiner.*

L. A. THAXTON, *Assistant Examiner.*

U.S. Cl. X.R.

260—77.5, 468, 479, 482